United States Patent
Flesselles (10) Patent No.: US 8,553,993 B2
(45) Date of Patent: Oct. 8, 2013

(54) METHOD AND SYSTEM FOR AIDED INPUT ESPECIALLY FOR COMPUTER MANAGEMENT TOOLS

(75) Inventor: Emmanuel Flesselles, Ozoir la Ferriere (FR)

(73) Assignee: Serensia, Paris (FR)

( * ) Notice: Subject to any disclaimer, the term of this patent is extended or adjusted under 35 U.S.C. 154(b) by 238 days.

(21) Appl. No.: 12/746,839

(22) PCT Filed: Dec. 10, 2008

(86) PCT No.: PCT/EP2008/067260
§ 371 (c)(1),
(2), (4) Date: Jun. 8, 2010

(87) PCT Pub. No.: WO2009/074623
PCT Pub. Date: Jun. 18, 2009

(65) Prior Publication Data
US 2010/0254608 A1    Oct. 7, 2010

(30) Foreign Application Priority Data

Dec. 10, 2007    (FR) ..................................... 07 08591

(51) Int. Cl.
| | | |
|---|---|---|
| *G06K 9/00* | (2006.01) | |
| *G06K 9/72* | (2006.01) | |
| *G06F 17/00* | (2006.01) | |
| *G06F 3/048* | (2013.01) | |

(52) U.S. Cl.
USPC ........... 382/229; 382/181; 715/224; 715/226; 715/764

(58) Field of Classification Search
USPC ................................ 382/181, 229
See application file for complete search history.

(56) References Cited

U.S. PATENT DOCUMENTS

| | | | |
|---|---|---|---|
| 5,857,034 A | 1/1999 | Tsuchiya et al. | |
| 6,192,380 B1* | 2/2001 | Light et al. ..................... | 715/207 |
| 7,149,347 B1* | 12/2006 | Wnek ........................... | 382/159 |
| 7,254,569 B2 | 8/2007 | Goodman et al. | |
| 7,259,887 B2* | 8/2007 | Lech et al. .................... | 358/1.15 |
| 7,334,184 B1* | 2/2008 | Simons ......................... | 715/234 |
| 7,343,551 B1* | 3/2008 | Bourdev ....................... | 715/224 |
| 7,492,946 B2 | 2/2009 | Elder et al. | |
| 7,660,779 B2 | 2/2010 | Goodman et al. | |
| 2002/0165877 A1 | 11/2002 | Malcolm et al. | |
| 2005/0257148 A1* | 11/2005 | Goodman et al. ............ | 715/534 |
| 2006/0059434 A1* | 3/2006 | Boss et al. .................... | 715/780 |
| 2007/0033118 A1 | 2/2007 | Hopkinson | |
| 2007/0130505 A1 | 6/2007 | Woods | |

FOREIGN PATENT DOCUMENTS

EP            1 596 310           11/2005

* cited by examiner

*Primary Examiner* — Stephen R Koziol
*Assistant Examiner* — Timothy Choi
(74) *Attorney, Agent, or Firm* — Harness, Dickey & Pierce, P.L.C.

(57) ABSTRACT

A method of aided input especially for a computer management tool, the management tool being executed in a computer system possessing an operating system furnished with instrumentation services, the method including the following steps: (a) entering raw data from an exterior source, (b) extracting relevant data from the raw data, (c) using the instrumentation services to transcribe the extracted data to corresponding fields of a preexisting input interface belonging to the management tool, within a view to allowing further inputs and overall validation. Application in particular to the semi-automated input of accounting items such as supplier invoices and the like.

20 Claims, 6 Drawing Sheets

METHOD AND SYSTEM FOR AIDED INPUT ESPECIALLY FOR COMPUTER MANAGEMENT TOOLS

CROSS-REFERENCE TO RELATED APPLICATIONS

This application is a National Phase Entry of International Application No. PCT/EP2008/067260, filed on Dec. 10, 2008, which claims priority to French Application 0708591, filed on Dec. 10, 2007, both of which are incorporated by reference herein.

TECHNICAL FIELD

This invention relates to a method for aided input (especially by automatic integration) of incoming data in data management software.

BACKGROUND

Figure 1:
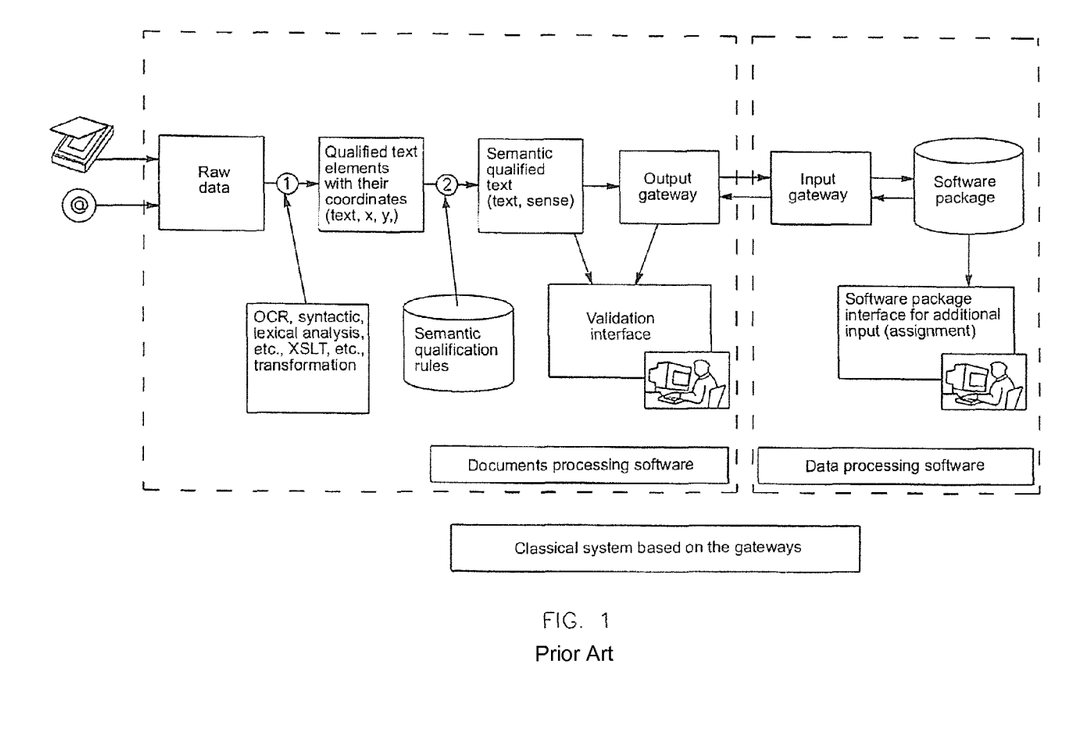
FIG. 1 is a schematic diagram of a method for aided input according to the prior art.

The methods of the prior art relate for example to the integration of dataflow accounting records in a computerized accounting system, by recognizing optical information contained in accounting records on paper format (typically invoices). A concrete example of such a known method is shown in FIG. 1. By referring to it, when it is desired to automate data integration in an ERP data, it is necessary to produce a stream of structured data that can be integrated into the software package. The flow is usually of two possible types: whether it comes from an electronic transmission system of the EDI type with a standard well specified file format (EDIFACT, XML, PDF, Text, tabular file, etc.) and then processed to the input specifications of the gateway software package, or it comes from an ADR system (for "Automatic Document Recognition") and processed to the input specifications of the gateway software package.

The process string is thus the following:
Paper→Scanner→OCR→Field extractions→Data structure to be integrated→Secure login→Data management software. However, it is common in this kind of method to deal with reliability defects (scanning error or incomplete data), incomplete data and/or the presence of specific cases. This is the reason why the incoming data require validation or manual corrections by the operator, and/or additional manual input by the operator in order to obtain a definitive integration into the structured data flow end-point of the software (in particular for comparison purposes, analytical assignment, accounting assignment in the case of management for third parties, etc.). So that, a second validation is required once the flow is sent to the software to complement and/or validate the data integration in the software.

Another type of difficulty arises in the case where the end-point software (e.g. software package) provides only incomplete, poor opportunities, even non-existent in terms of gateway, allowing introducing data in the system other than by input in input fields aided by the system keyboard. It is the case for example in a pre-existing software the code of which is closed (e.g. owner software), and the integration capabilities of structured data flow are poor, even non-existent or poorly documented.

Moreover, this type of method offers virtually no feedback on the end-point software package on corrections to be carried out concerning raw data. Generally, the feedback type of the software package is limited to an error code, often in real time, without allowing any learning to the validation software. Thus, corrections brought about in the software are usually not taken into consideration in the preparation of structured data stream.

SUMMARY

This invention has the object of overcoming the limitations of the prior art and in particular to overcome the lack of gateway input of a data management software package, or even to overcome the low quality of services, or lack of opportunities (e.g. lack of gateway feedback) from such a gateway, should it be present. A further object of this invention is to simplify and optimize the complementary manual inputs that are usually necessary, in order to gain productivity time, in particular by grouping them together into a single point of the process with the correction step/OCR module validation. A further object of this invention is to authorize, without complicating the whole process, an enriched input. Finally, an object of this invention is to capitalize on these enrichments to improve the quality of data extraction intended to feed aided input.

To this effect, it is proposed to instrument the software package input interfaces to make them play the triple role of automatic or semi-automatic integration gateway, of screen allowing additional inputs, and finally as an information source (namely, the data already contained in the management tool and/or derived from operator actions to enrich the initial extraction and processing treatments performed on the data raw source to improve permanently these treatments). Thus, the invention allows using the software input screen as an automatic or semi-automatic incoming gateway in the software. A functional enrichment at the package software input screen is therefore obtained. Indeed, the software input screen thus becomes the secure login of the software.

More specifically, this invention provides a method for aided input in particular to a computer management tool, the management tool being implemented in a computer system with an operating system equipped with instrumentation services characterized in that it comprises the following steps:

(a) input of raw data from an external source,
(b) extracting relevant data from said raw data,
(c) use of the said instrumentation services to transcribe the said data extracted towards corresponding fields of a pre-existing input interface belonging to the management tool, in view of allowing additional inputs and a validation as a whole.

By the term "instrumentation service" it is intended a set of characteristics offered by an operating system and its windowing module or an environment of any whatsoever office. These services comprise several characteristics among which:

the opportunity to explore the software structure of the interface windows to determine their composition through programming (for example, discover that the window contains a menu, an "ok" button, several input fields, the fact that such fields or such text contains such value, etc.), the opportunity to determine and/or be notified of user actions (pressing a key, click on a button, etc.), and the opportunity to determine and/or be notified of interface status changes (determine the foreground window, determine the cursor location, determine the function by default when pressing a particular key, such as the "enter" key, etc.), and the opportunity to simulate user actions, input key, mouse click, but also moving and changing window size, moving the focus point, etc.

The joint use of all these operations allows a full instrumentation of an input screen. It is possible to implement these instrumentation services, in particular through the operating system function call, API (Application Programming Interface).

The following are some beneficial but non-exhaustive aspects of this method:

the instrumentation services allow in particular to discover the model and the content of a pre-existing input screen and to simulate user actions, the method comprises before the transcription step, a displaying step, organized pre-input fields, of relevant data extracted in view of their pre-validation.

the extraction step comprises a paper image scan in digital image, or a reading step of a structured file or described according to a predetermined description language.

the extraction step comprises optical character recognition or a document conversion in alphanumerical listed elements and associated coordinates, or a lexical and syntactic analysis.

the method further comprises a data qualification validation, extracted by using a rules-based extraction.

the step (b) comprises an allocation, by using a rules-based pre-input, of the possible values for the various pre-input fields.

the transcription step (c) is performed by calling API functions at the operating system level and at the management tool level to simulate an input in the management tool input module fields.

the method further comprises a manual input step of additional data in the management tool pre-existing input module, and an enriching step of the pre-input rules-base and/or of the extraction rules-base depending on the additional data.

the method comprises a step of simultaneous display of a raw data representation in a first display zone, of pre-input field in a second display zone, and of an input screen of the pre-existing input module in a third display zone. The invention also provides a computer system, comprising a CPU, programme and work memories, input devices and a display device, characterized in that it contains programmes able to implement the method as defined above.

BRIEF DESCRIPTION OF THE DRAWINGS

Other aspects, goals and advantages of this invention will become more apparent upon reading the following detailed description of a preferred embodiment thereof, given as a non limiting example and made with reference to the accompanying drawings, in which:

FIGS. 3 to 6 are examples of screen-images obtained with the method for aided input according to the invention.

DETAILED DESCRIPTION OF A PREFERRED EMBODIMENT

Figure 2:
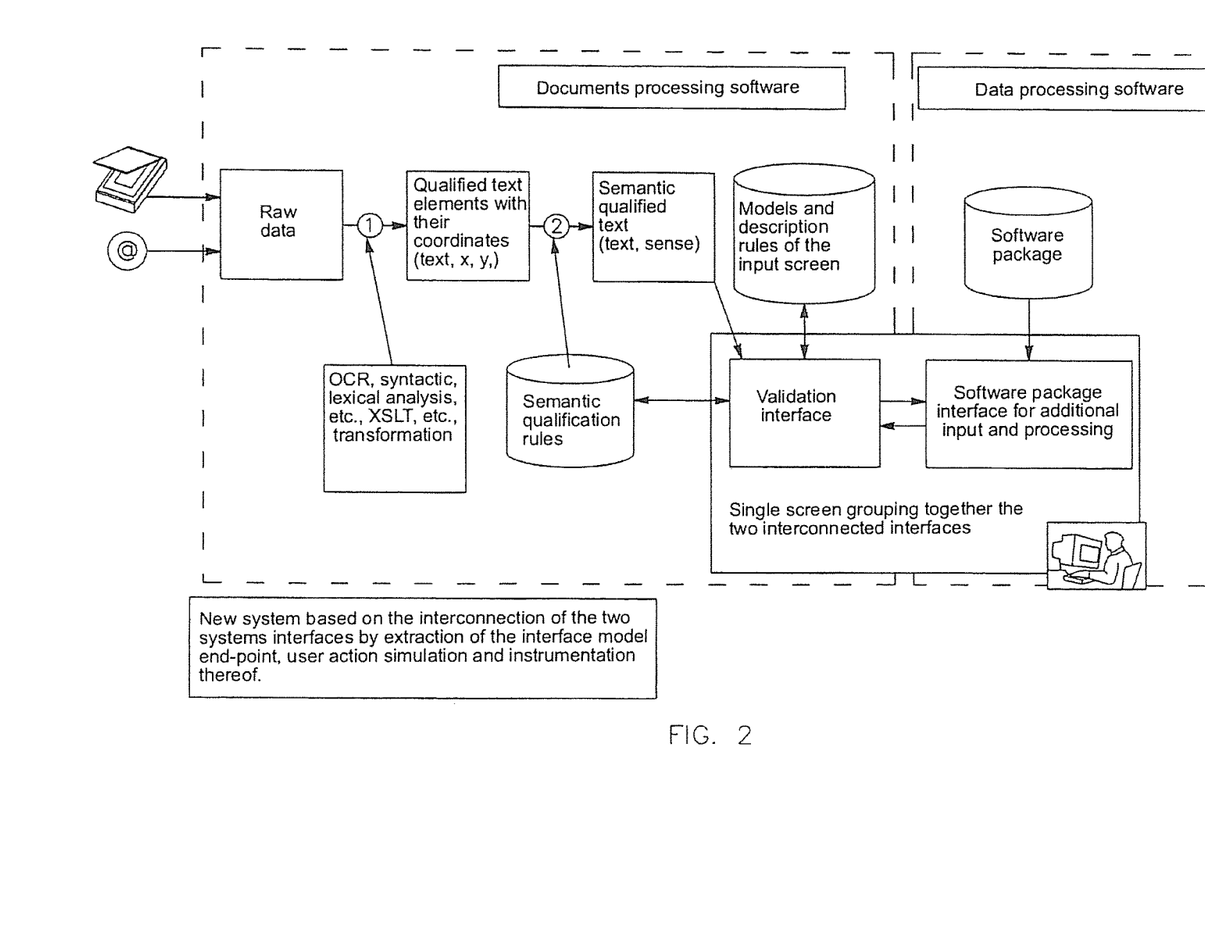
FIG. 2 is a schematic diagram of a method for aided input according to the invention.

The invention will now be described in detail by referring to an example of classical application thereof, consisting in incorporating automatically the contents of supplier invoices in an ERP. With reference to FIG. 2, the incoming aided input data according to the invention involves the following sequence of steps:

1) Input of the raw data from its external source,
 a. either by a scanner that converts a paper image into a digital image,
 b. or by a receiving automaton that reads a structured file, for example of the EDIFACT or XML type, or even described according to a page description language of the PDF, XPS, Postscript, etc., type.

2) Extraction of related data from the raw file,
 a. either by an Optical Character Recognition (OCR) module which is able of finding text elements and their position in the image for the scanned documents,
 b. or by conversion programmes (e.g. of the PDF2XML type) for documents of the PDF, text, PostScript, XPS type, which allow transforming a document into a text list of pieces associated to their XY coordinates in the document,
 c. or even by lexical and syntactic analysis for structured files of the XML type.

3) Qualification of the data thanks to a pre-existing rules-base which was fed manually and then enriched by the user, through which the programme is able to associate a semantic meaning to each field in isolation from each other with an appropriate confidence level.

Some examples of rules are given below:

If the data is a number with two digits after the decimal point associated with the euro symbol and that the text located to its left is "Inclusive of All Taxes", this "Inclusive of All Taxes" data could be qualified with a high confidence level;

If the name of the supplier or his SIREN number (French Business Registration Number) was identified, it is likely that the net amount excluding taxes is located in the same zone on all documents issued by the same supplier.

4) Preparation for input (pre-input module) into two sub-steps:
 a. a second rules-base related on the input screen operation allows to assign to each input screen field 0, 1 or N potential values depending on the result of the previous step,
 b. the data thus qualified are offered to the user who can validate them, complete them or correct them in a pre-input zone by referring to the source displaying zone, which contains, as the cases may be:
  i. either an original representation of the typical document of a scanned document or described in page description language;
  ii. or a reconstituted representation of the document in the case of a structured file of the XML, EDIFACT, etc., type.

5) Semi-automatic input, with two main sub-steps:
 a. when the user decides to validate these data in the pre-input screen, these values are then transcribed automatically into the corresponding fields of the management software pre-existing input screen; this transcription is carried out by calling the pre-existing functions of the management tool where available, or otherwise, for example, by the following process:
  i. Calls for the instrumentation services of the operating system to find the sought input window of the management software,
  ii. Calls for the instrumentation services of the operating system of the machine for simulation of actions on an input device of the mouse type,
  iii. Calls for the instrumentation services of the operating system for simulation of deep pressing of the machine keyboard keys corresponding to the alphanumerical data to be transcribed,
 b. on this very pre-existing input screen and thus pre-filled in some of its fields, the user can decide to complete the input before the final validation, by using programmes belonging to the management software; during these additional inputs, the method according to the invention provides advantageously that the pre-input module (ref. point 4) above) is also fed by these additions, such as detected for example by the corresponding keyboard actions/mouse, and this for implementing step 6) below.

6) The pre-input module then performs the following operations:

a. enrichment of the second rules-base above, to be able then to formulate to the user richer pre-input proposals when a set of similar data arises. For example, from the feedback of these additional inputs, the pre-input module may further deduct an accounting assignment code to be suggested at the next input by automatically associating it to the supplier.

b. enrichment of the first rules-base above, for example by holding the position of the invoice fields.

FIGS. 3 to 4 and 5 to 6 show two examples of displays generated by the method and the system of the invention. As shown in these figures, it is advantageous according to one aspect of the invention to provide in a common display window:

a first zone Z1 containing the graphical representation of the original document, with boxed alphanumerical elements A, B, C, D, etc., representative of the existence of recovered values at the extraction step;

a second zone Z2 of pre-input, where the extracted information can be checked and validated; and a third zone Z3 which is none other than the management software pre-existing input screen.

Figure 3:
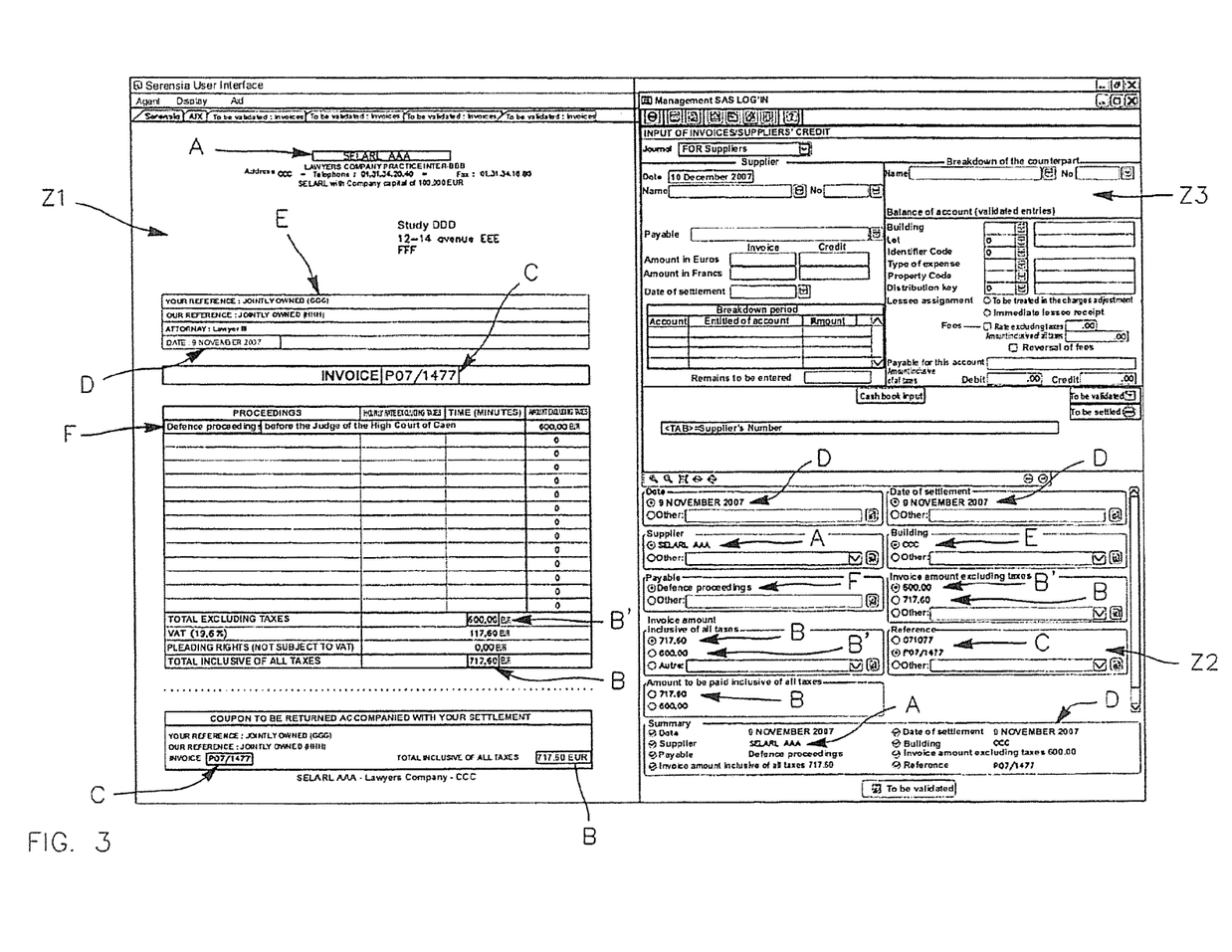
Figure 4:
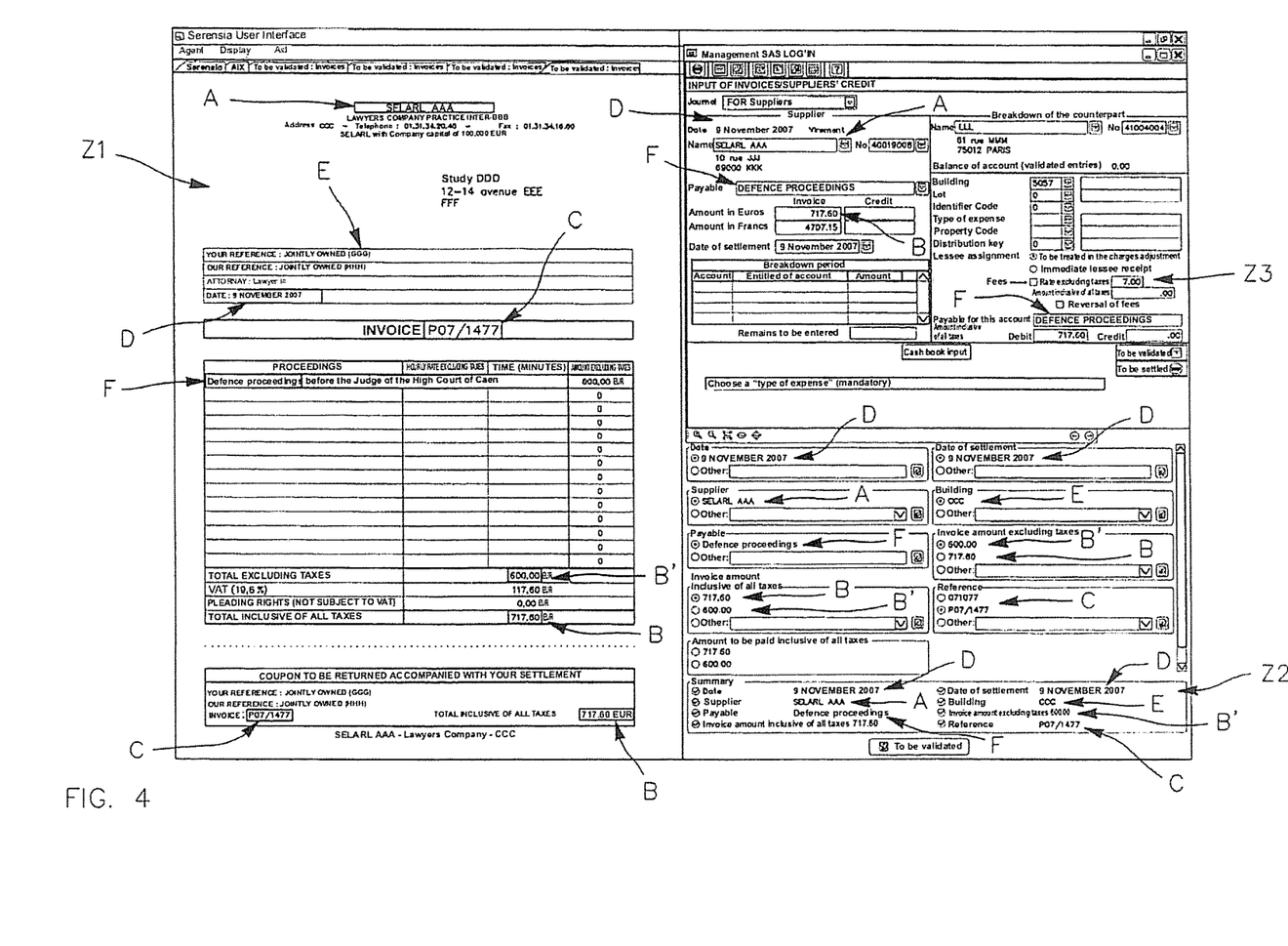
Figure 6:
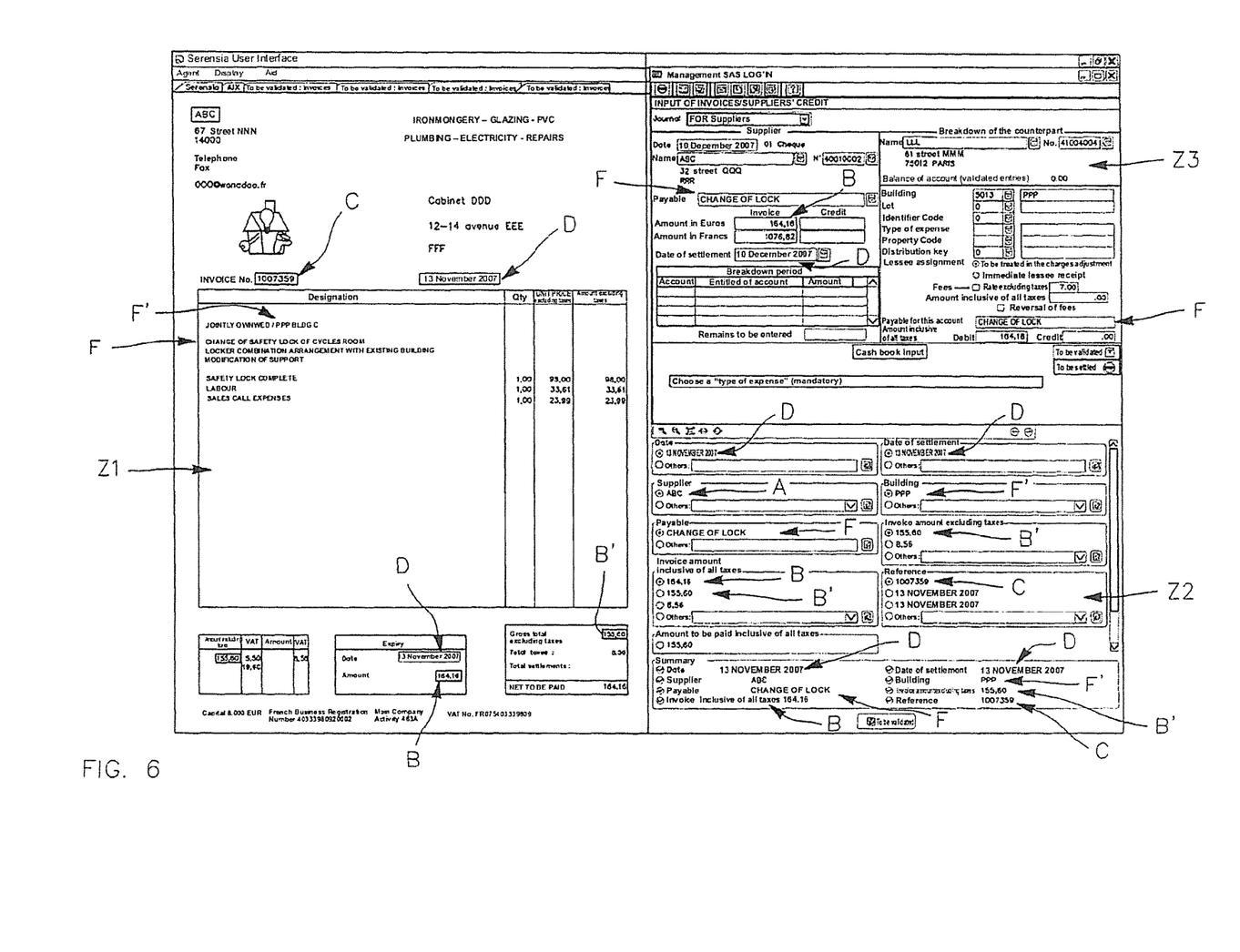

FIG. 3 shows the display before transcription of the collected data in the screen of zone Z3, this transcript being shown in FIG. 4, where the transcript alphanumerical elements are designated by the same reference symbols A, B, C, etc., such as in zone Z1. FIGS. 5 and 6 show another example according to the same principle.

Of course, the skilled in the art can bring about to the invention many variations and modifications. For example, it is possible to use semi-transparent representation mechanisms on pre-input zones and Z2 and Z3 inputs to facilitate display and interpretability of these zones. Thus, pre-input zone Z2 disappears to come in transparent mask on zone Z3 in order to obtain a functional enrichment of the input screen.

Some characteristics of zone 2 can also be spread on zone 1 allowing to start from a recognized zone of raw data to be suggested for the input screen fields of the software package as end-point fields (for example in the shape of a context menu). It is also possible, in the display of zone Z1, to associate a text zone (such as a label) to a defined zone of the input screen by a mechanism such as the following:

selecting the pertinent zone with the mouse by framing or single click;

in response to this selection, display of a shortcut menu that contains the list of possible pre-input screen fields;

by using the mouse, choice of the field to which it is desired to match this text zone.

The invention claimed is:

1. A method of aided input for a computer management tool, the management tool being executed in a computer system possessing an operating system furnished with instrumentation services, the method comprising:

inputting raw data from an exterior source;

extracting related data from the raw data;

displaying, in pre-input fields, the related data for pre-validation;

formulating proposed values for the pre-input fields by learning from corrections made to previously validated data when the related data are similar to the previously validated data;

allocating, using a pre-input rules-base, the proposed values for the pre-input fields; and using the instrumentation services to transcribe the extracted data towards corresponding fields of a pre-existing input interface belonging to the management tool, to allow additional inputs and validation.

2. The method according to claim 1, wherein the instrumentation services discover a model and content of a pre-existing input screen and simulate user actions.

3. The method according to claim 1, wherein the extraction comprises a paper image scanned in digital image, or a reading of a structured file or described according to a predetermined description language.

4. The method according to claim 1, wherein the extraction comprises character or document conversion optical recognition in list of alphanumerical elements and associated coordinates, or a lexical and syntactic analysis.

5. The method according to claim 1, which further comprises, after the extraction, an intermediate qualification of the extracted data, using an extraction rules-base.

6. The method according to claim 1, wherein the transcription is performed by call of the instrumentation services of the operating system to simulate an input in input module fields of the management tool.

7. The method according to claim 1, further comprising a manual input of additional data in the pre-existing input module of the management tool, and an enrichment of at least one of the pre-input rules-base and an extraction rules-base depending on the additional data.

8. The method according to claim 1, comprising a simultaneous display of a raw data representation in a first display zone, of pre-input fields in a second display zone, and an input screen of a pre-existing input module in a third display zone.

9. The method according to claim 1, wherein the computer system further comprises a CPU, working memories, input devices, a display device, and programs implementing the method of claim 1.

10. A method comprising:

receiving data including contents of a document;

validating extracted data, from the received data, using a rules-base;

receiving a manually entered input to correct the validated data;

updating the rules-base based on the manually entered input;

formulating pre-input proposed values for pre-input fields by learning from the correcting of the validated data when a set of similar data is subsequently extracted; and validating the subsequently extracted data using the updated rules-base, wherein validating extracted data using a rules-base includes displaying the extracted data in pre-input fields for pre-validation.

11. The method of claim 10, further comprising receiving the data from a scanner that scans the document.

12. The method of claim 10, further comprising receiving the data from a file that includes the data in a predetermined file format.

13. The method of claim 10, further comprising updating the rules-base to improve validation of the subsequently received data.

14. A method comprising:

receiving data including contents of a document;

validating extracted data, from the received data, using a rules-base;

receiving an input to correct the validated data;

updating the rules-base based on the input;

formulating pre-input proposed values for pre-input fields by learning from the correcting of the validated data when a set of similar data is subsequently extracted; and validating the subsequently extracted data using the updated rules-base, wherein validating extracted data using a rules-base includes:

reading a structured file according to a predetermined description language;

discovering a model and content of an input screen and simulating user actions;

displaying the extracted data in pre-input fields in view of their pre-validation; and transcribing the extracted data towards corresponding fields of a pre-existing input interface of a program in view of allowing additional inputs and a validation.

15. The method of claim 14 wherein extracting data comprises optical character recognition or a document conversion in alphanumerically listed elements and associated coordinates, or a lexical and syntactic analysis.

16. The method of claim 14 wherein the extracted data is extracted by using a rules-based extraction.

17. The method of claim 14 wherein the data extraction comprises an allocation, by using a rules-based pre-input, of pre-input proposed values for various pre-input fields.

18. The method of claim 14 wherein transcription is performed by calling API functions at operating system level and at a management tool level to simulate an input in management tool input module fields.

19. The method of claim 14 wherein receiving an input includes a manual input of additional data in a management tool pre-existing input module; and updating the rules base includes enriching a pre-input rules-base and/or an extraction rules-base based on the additional data.

20. The method of claim 14 further comprising a step of simultaneous display of a raw data representation in a first display zone, of pre-input field in a second display zone, and of an input screen of the pre-existing input module in a third display zone.

* * * * *